March 25, 1969  J. H. WIGGINS  3,434,816
GASHOLDER PROVIDED WITH MECHANISM FOR PREVENTING WRINKLING
OF THE FLEXIBLE CURTAIN SEAL INCORPORATED THEREIN
Filed March 29, 1965  Sheet 3 of 3

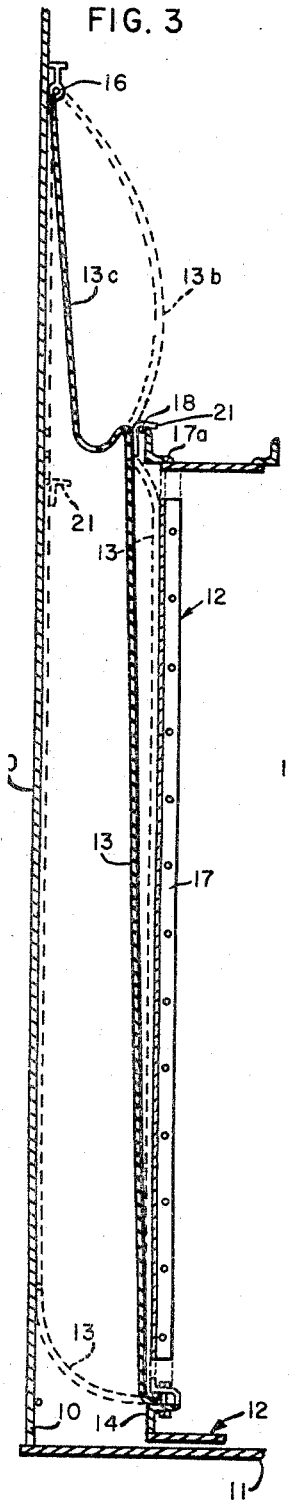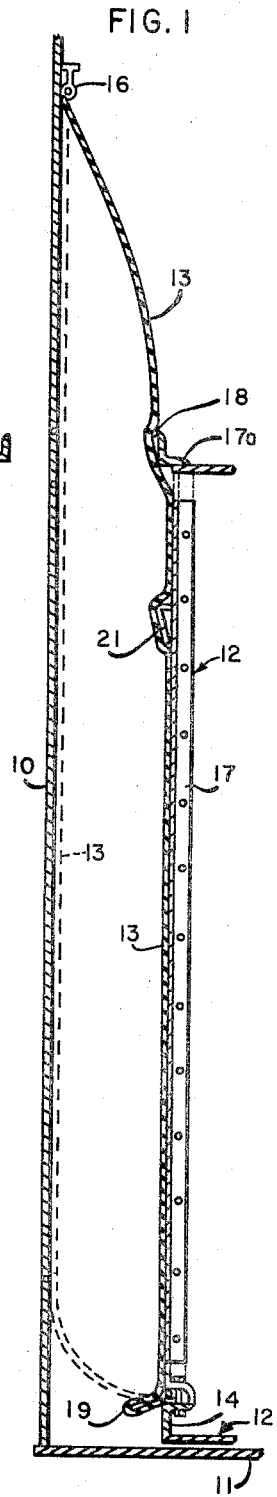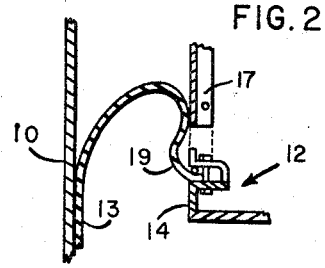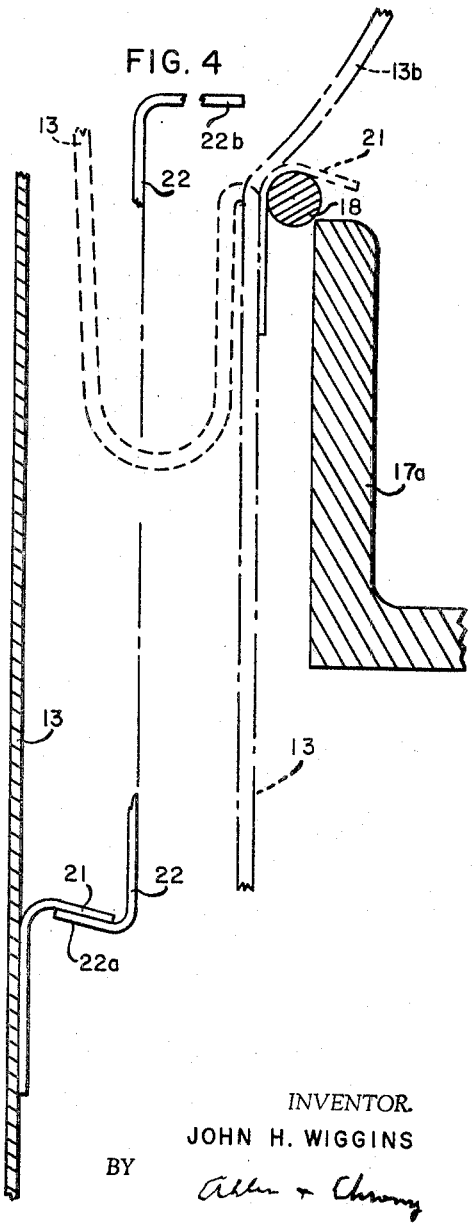

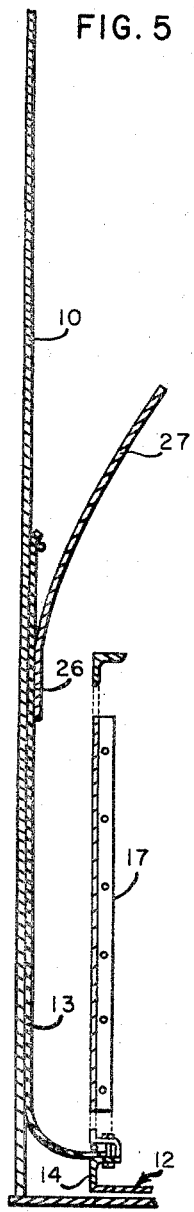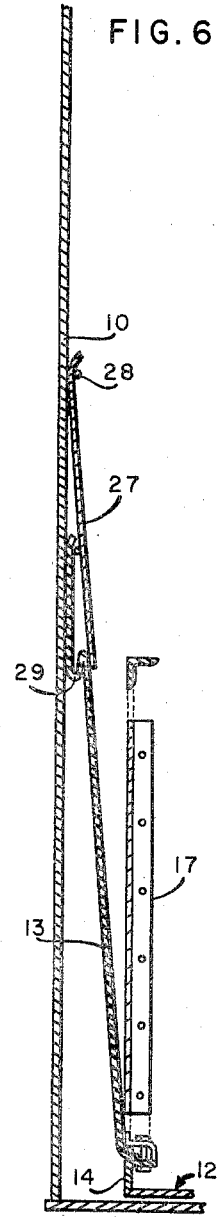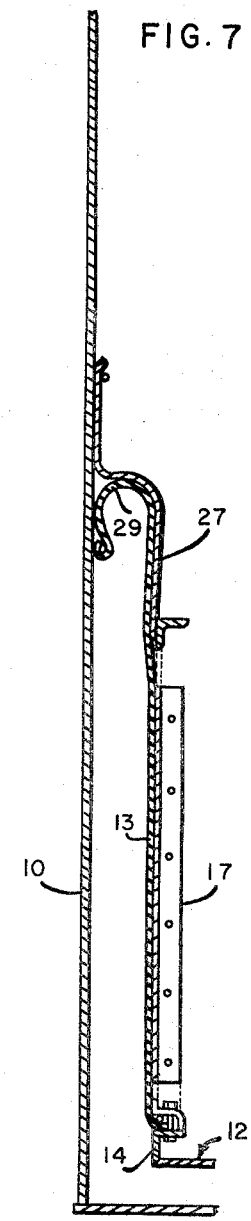

INVENTOR.
JOHN H. WIGGINS
BY
ATTORNEYS 3,434,816
GASHOLDER PROVIDED WITH MECHANISM FOR PREVENTING WRINKLING OF THE FLEXIBLE CURTAIN SEAL INCORPORATED THEREIN
John H. Wiggins, P.O. Box 418,
Menlo Park, Calif. 94025
Filed Mar. 29, 1965, Ser. No. 443,266
Int. Cl. F17b 1/26
U.S. Cl. 48—179   6 Claims

ABSTRACT OF THE DISCLOSURE

There is disclosed in a gasholder of the low pressure type including an outer cylindrical wall structure and a cylindrical fender structure disposed therein and a flexible curtain seal secured to the structures and forming a seal therebetween, a series of seal lifting elements attached in a circular array to the curtain seal and to one of the structures to eliminate sag in the curtain seal and subsequent wrinkling of the curtain seal when the fender structure is in the lowermost portion thereof.

---

The present invention relates to low pressure gas containers or gasholders of the character disclosed in the patent to Wiggins et al., No. 2,723,908, and also as disclosed in my co-pending application Ser. No. 432,582 filed Feb. 15, 1965, for Dry-Seal Pressure-Type Gasholders. In this type of gasholder there is provided an annular or cylindrical flexible curtain seal which is secured at one end to the outer wall structure of the gasholder intermediate the height thereof and which is secured at its other end to the bottom of a fender structure on a piston structure spaced within the wall structure. The curtain seal is fastened in sealed relation at both positions of attachment so that as the piston structure rises and falls with respect to the wall structure the curtain seal will follow and under gas pressure will be applied to the fender structure as an inner backstop during its lower part of travel of the piston structure and to the wall structure as an outer backstop during the upper part of travel of the piston structure. In such curtain seals it is necessary to provide a certain amount of slack in the curtain seal for freedom of movement so that, when the curtain seal is hanging free within the working gap between the wall structure and the piston structure, the curtain seal is free to flex and move and be inverted in a loop under the gas pressure as it moves. This slack produces a sag when the curtain seal is free of pressure with the excess part of the curtain seal at the bottom. When gas pressure is first applied, this slack loop produces a circular fold in the curtain seal adjacent to the bottom of the piston structure which cannot be removed until the piston structure rises to its top-most position when a slip occurs between the curtain seal and the fender structure to straighten out this fold. In the normal operation of a gasholder, the gasholder is rarely completely filled, and only through overfilling in actual service can this fold be pulled out. This may never occur or only after several years of use of the gasholder. The result is deterioration of the curtain seal at this point either because the annular fold is never removed or is only partly removed, the latter causing vertical wrinkling of the curtain seal. I have found that when slip-up in the curtain seal occurs the curtain seal will slip-up at certain parts and at certain parts will fail to slip-up. Such failure will cause the curtain seal to creep horizontally or sidewise and such sidewise creeping stretches the curtain seal locally. I also find that under this condition certain vertical wrinkles form in the curtain seal that eventually can make a vertical fold and thereby cause the curtain seal to leak.

It is a general object of the present invention to provide in a gasholder a curtain seal control which will remove any fold at the bottom and provide for even and smooth application of the curtain seal to the fender structure at the first application of gas pressure and thereby eliminate the necessity of slip-up later on in the operation of the gasholder.

A further object of the invention is to provide means for lifting the curtain seal from a location intermediate its height so that the excess portion of the curtain seal even when the gasholder is practically empty produces an upwardly disposed loop adjacent to the top of or above the fender structure so that the curtain seal is applied as a smooth surface to the fender structure under gas pressure.

Still another object of the invention is to provide means for eliminating the necessity for slip-up of the curtain seal as outlined above which means is of simple construction, easy to apply and requires no maintenance.

The above and other objects of the invention are attained as described in the accompanying specification, taken in connection with the attached drawings, in which:

FIGURE 1 is a fragmentary vertical sectional view through the wall of the tank of a gasholder and the adjacent piston structure and the fender structure carried thereby illustrating the curtain seal when pressure is first applied thereto so that an objectionable wrinkle or fold is present in the curtain seal;

FIG. 2 is a fragmentary view similar to FIG. 1, but illustrating the parts when the piston structure and the fender structure carried thereby are close to the top of its travel when slip-up can occur and when the fold in the curtain seal is partially removed by slip-up;

FIG. 3 is a view similar to FIG. 1 but illustrating one form of the invention to eliminate the sag at the bottom of the curtain seal;

FIG. 4 is an enlarged sectional view illustrating one arrangement of attachment of the bottom sag eliminating means;

FIG. 5 is a fragmentary sectional view illustrating the application of a second form of bottom sag eliminating means;

FIG. 6 is a similar view to FIG. 4 showing the sag eliminating means in place;

FIG. 7 is a sectional view similar to FIGS. 4, 5 and 6 and illustrating the parts during the lift of the piston structure when the top sag has been eliminated and the curtain seal is beginning to reverse itself in travelling from the inner backstop on the fender structure to the outer backstop on the wall structure of the gasholder;

Figure 8:
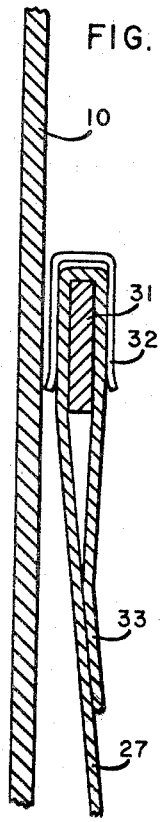
FIG. 8 is a fragmentary enlarged sectional view illustrating one arrangement of attachment of the curtain seal lifting element to the outer wall structure.

Referring first to FIGS. 1 and 3, the gasholder of the instant invention comprises a cylindrical outer wall structure 10 and a bottom wall 11 upon which a cooperating piston structure 12 rests when the container or tank is empty and free of gas pressure. A cylindrical flexible curtain seal 13 is attached to the piston structure 12 at 14 along a circular line adjacent to the edge thereof in gas-tight relation and extends upwardly to a circular line of attachment to the wall structure 10 where the curtain seal 13 is attached by means of a conventional seal bar 16 and suitable clamping keys secured to the wall structure 10.

The piston structure 12 carries an upstanding fender structure 17 which serves as an inner backstop for the curtain seal 13. Before any gas under pressure is admitted to the gasholder, the curtain seal 13 assumes the dotted line position shown in FIG. 1 due to the weight and extra length thereof, i.e., the curtain seal 13 lies against the inner surface of the wall structure 10 that serves as an outer backstop and is spaced from the outer wall of the fender structure 17.

As seen in FIG. 1, when gas pressure is first admitted to the gasholder and if there is no device for eliminating the sag of the curtain, the seal 13, it is pressed against the structure 17 provided by the fender of the piston structure 12 and a circumferential fold 19 is produced at the lower end of the curtain seal 13 and this fold 19 will remain in this position by virtue of the gas pressure until some force is exerted on the curtain with respect to the fender structure 17 to produce the so called "slip-up." This can occur only very near the top of the travel of the piston structure 12 and the fender structure 17 with respect to the wall structure 10 as shown in FIG. 2, and the slip-up never occurs evenly until the gasholder is completely full so that one point will slip-up and another point will hold so that the curtain seal 13 is alternately effectively longer and shorter all around.

In accordance with one form of the instant invention a plurality of clips 21 of angle shape are secured to the curtain seal 13 at a location intermediate its height which is spaced below the top angle 17a of the piston structure 12 by an amount substantially equal to the increased length of the curtain seal 13 due to the arc shown in the curtain seal 13 at its lower end in dotted lines in FIG. 1. These clips 21 are secured to the curtain seal 13 in spaced apart relation as a circumferential series and set correctly in the shop. When these clips 21 are raised to the solid line position as shown in FIG. 3 and engage over a circular bar 18 attached to the piston structure 12, the curtain seal 13 is pulled nearly straight with respect to the fender structure 17. Subsequent introduction of gas pressure with the clips 21 connected over the circular bar 18 on the angle 17a will result in movement of the curtain seal 13 to the position shown by dotted lines at 13b. FIG. 4 illustrates in full lines a clip 21 in its relation to the curtain seal 13 and the annular angle 17a forming the upper rim of the fender structure 17 and the circular bar 18 which forms a notching means for the clips 21 in their upper slip-up eliminating position. In this view there is shown a suitable attachment 22 comprising a hook 22a at the lower end and a handle 22b at the other end by means of which a person standing on a platform within the piston structure 12 can reach down and secure each clip 21 and lift it up until it rests over the cooperating retainer bar 18. This operation should be performed when the gasholder is first put into operation. It will be noted that the horizontal leg of the clip 21 has a downward and inward slope which prevents slipping off of the bar 18 when there is no gas pressure against the curtain seal 13. Under partial vacuum, the downward and inward slope is increased due to tilting of the clip 21 so that the clip 21 hooks the bar 18 tighter when the curtain seal 13 moves to the left in FIG. 4. Then when gas pressure pushes the curtain seal 13 against the fender angle 17a the vertical leg of the clip 21 is tilted to tip the horizontal leg of the clip 21 upward to allow the clip 21 to slide smoothly off of the rod 18 as the piston structure 12 rises. When the piston structure 12 descends, the reverse process occurs and the clip 21 is re-engaged with the rod 18.

Referring now to FIGS. 5 through 10 which illustrate a modified form of the invention, the container wall structure 10, the piston structure 12 and the curtain seal 13 are of the form described above. Attached to the curtain seal 13 at 26 is a fabric strip 27, the point 26 being at a proper distance below the curtain seal 13 attachment to the wall structure 10 (the upper end of the strip 27 being shown free and unattached in FIG. 5).

Each of the strips 27 is clamped by means of a suitable bar 28 (FIG. 6) to the wall structure 10 at a suitable point above the piston structure 12 (when the the lowermost position thereof) and results in lifting the curtain seal 13 just enough to pull out any annular fold adjacent to the bottom of the piston structure 12 and to form a similar sized fold 29 adjacent to the top of the piston structure 12. When gas starts to fill the tank and pressure is applied to the curtain seal 13, the parts first occupy the positions shown in FIG. 7 where the curtain seal 13 is pressed against the backstop structure 17 and the fold 29 has been removed by upward bellying of the curtain seal 13 under pressure. As the piston structure 12 continues to rise, the curtain seal 13 makes a full loop, and the strip 27 becomes slack and folds between the curtain seal 13 and the wall structure 10 as shown in FIG. 7.

Figure 9:
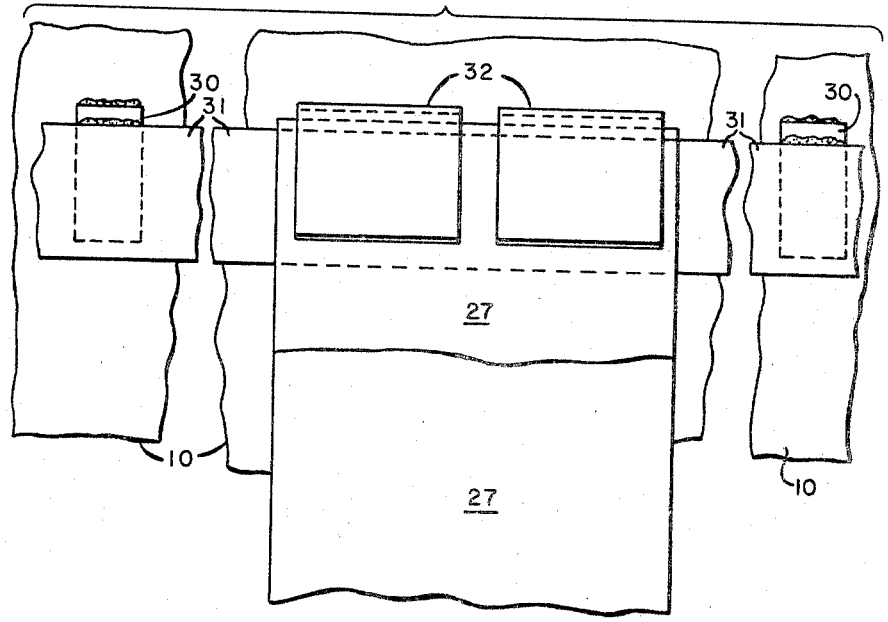
FIG. 9 is an elevational view of the structure shown in FIG. 8 as viewed from the right thereof.
Figure 10:
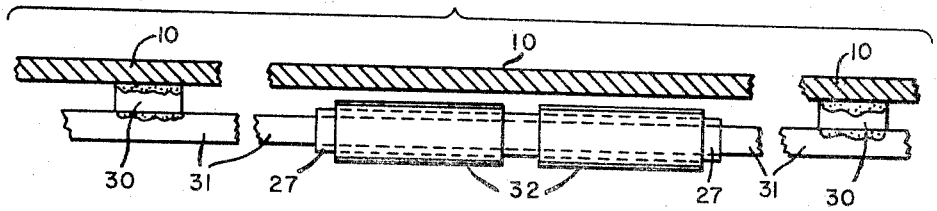
FIG. 10 is a plan view of the parts shown in FIG. 9.

One means of attaching these lifting strips 27 is illustrated in FIGS. 8 through 10, and in accordance with the arrangement there shown, there is secured around the inside of the wall structure 10 an annular bar 31 which is spaced from the wall by a plate 30 welded to the bar 31 and to the wall structure 10. The strip 27 is then inserted between the bar 31 and the wall structure 10 and is looped over and downwardly to meet its lower part. After the strip 27 has been employed to lift the curtain seal 13 a desired amount, U-shaped clips 32 are applied to secure each strip 27 in place. If desired, the end of the strip 27 is cemented to an intermediate portion of the strip 27 as indicated at 33. It will be seen, therefore, that by appropriate lifting of the series of strips 27, the curtain seal 13 is correspondingly lifted to eliminate any possibility of sag at the lower end thereof and to place any excess portion of the curtain seal 13 or sag at an upper location where it will not interfere with the smooth application of the curtain seal 13 to the inner backstop provided by the fender structure 17 formed on the piston structure 12.

While I have shown and described certain preferred forms of the invention, it is apparent that the invention is capable of modification and variation from the forms shown so that the scope thereof should be limited only by the proper scope of the claims appended hereto.

What I claim is:

1. In a gasholder of the low pressure type having an outer cylindrical wall structure, a cylindrical fender structure disposed within said wall structure and spaced radially inwardly therefrom to provide an annular operating gap therebetween, a flexible curtain seal having one end secured in sealed relation to said wall structure along a circular line intermediate the height of said wall structure and having its other end secured in sealed relation to said fender structure along a circular line adjacent to the bottom of said fender structure, lifting means for said curtain seal to lift the lower portion thereof to remove any bottom sag therefrom, and holding means for said lifting means to maintain the desired lifting adjustment thereof.

2. In a gasholder as recited in claim 1, in which said lifting means comprises a plurality of clips secured to said curtain seal at a location spaced below the top thereof and adjacent to the top of said fender structure, and an element on said fender structure to receive said clips in supporting relation therewith.

3. In a gasholder as recited in claim 1, in which said lifting means comprises a plurality of strips attached to said curtain seal at a location intermediate the height thereof and extending upwardly therefrom and being attached to said wall structure in order to lift said curtain seal to provide a slack fold adjacent to the top of said fender structure.

4. In a gasholder as recited in claim 1, in which said lifting means is of a flexible construction so as to move with said curtain seal in its looping motion in the transfer of said curtain seal from an inner backstop on said fender structure to an outer backstop on said wall structure.

5. In a gasholder of the low pressure type having an outer cylindrical wall structure, a cylindrical fender structure disposed within said wall structure and spaced radially inwardly therefrom to provide an annular operating gap therebetween, a flexible curtain seal having one end secured in sealed relation to said wall structure along a circular line intermediate the height of said wall structure and having its other end secured in sealed relation to said fender structure along a circular line adjacent to the bottom of said fender structure, and a series of seal lifting elements attached in a circular array to said curtain seal and to one of said structures, the point of attachment of each one of said lifting elements with respect to said curtain seal being located so that with said one lifting element in place and active with respect to said curtain seal a slack fold is produced in said curtain seal adjacent to the upper edge of said fender structure.

6. In a gasholder of the low pressure type having an outer cylindrical wall structure, a cylindrical fender structure disposed within said wall structure and spaced radially inwardly therefrom to provide an annular operating gap therebetween, and a flexible curtain seal having one end secured in sealed relation to said wall structure along a circular line intermediate the height of said wall structure and having its other end secured in sealed relation to said fender structure along a circular line adjacent to the bottom of said fender structure, said curtain seal normally having a slack portion adjacent to the lower part of said fender structure when said curtain seal is free of gas pressure; the combination with said curtain seal and said wall structure and said fender structure, of an annular series of curtain lifting elements, each element having means for attachment to said curtain seal and means for attachment to one of said structures.

References Cited

UNITED STATES PATENTS 1,979,657   11/1934   Wiggins _____ 220—26

JAMES H. TAYMAN, Jr., *Primary Examiner.*

U.S. Cl. X.R.

48—174, 176; 220—26, 85